Nov. 12, 1957  R. W. SHIPMAN ET AL  2,813,245
ELECTRICAL CONTROL APPARATUS
Filed March 26, 1954  5 Sheets-Sheet 1

INVENTORS.
Roy W. Shipman,
Keith S. McMullan.
BY
John L. Stoughton
THEIR ATTORNEY Nov. 12, 1957   R. W. SHIPMAN ET AL   2,813,245
ELECTRICAL CONTROL APPARATUS
Filed March 26, 1954   5 Sheets-Sheet 3

INVENTORS.
Roy W. Shipman,
Keith S. McMullan.
BY
John L. Stoughton
THEIR ATTORNEY.

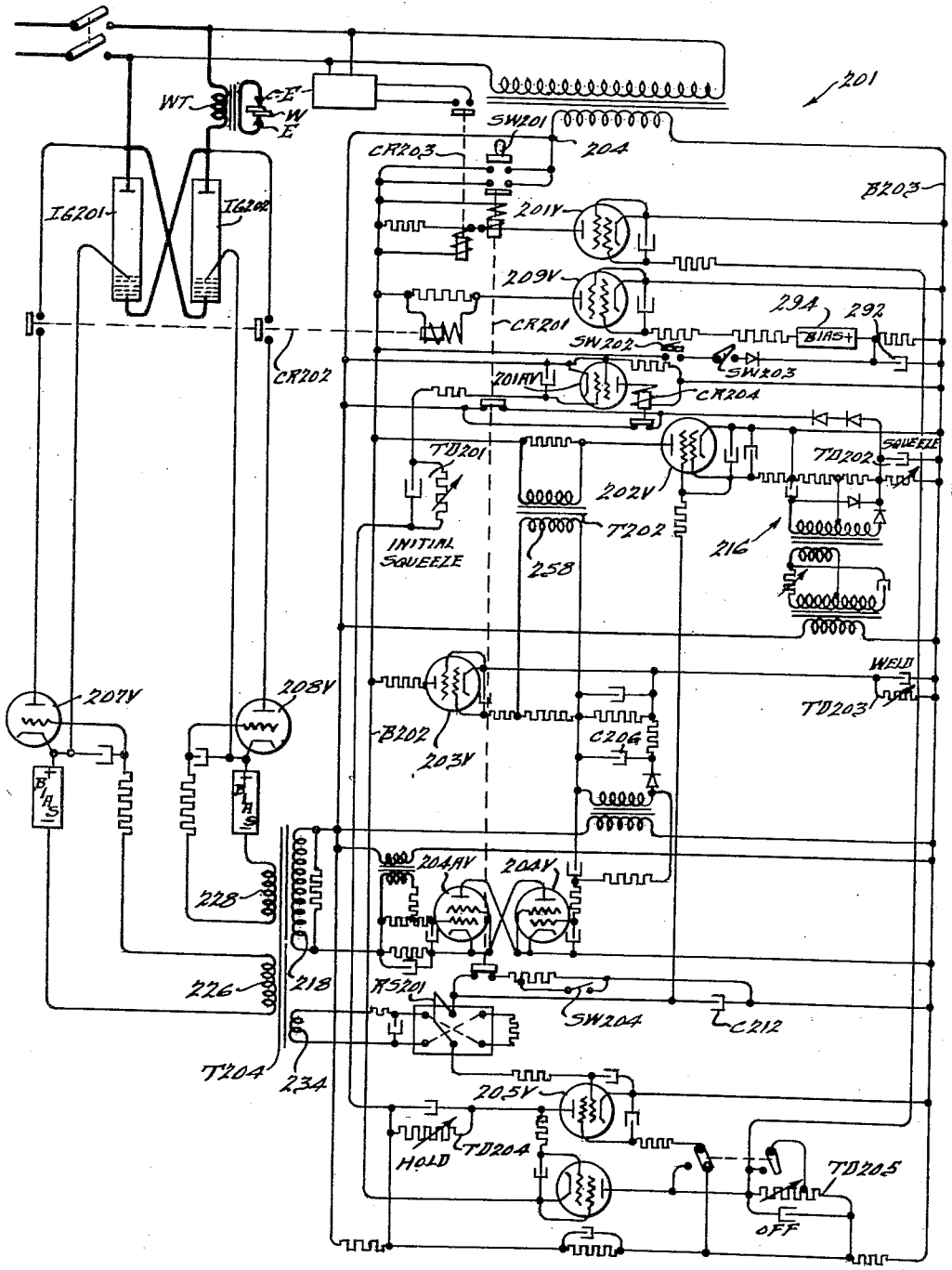

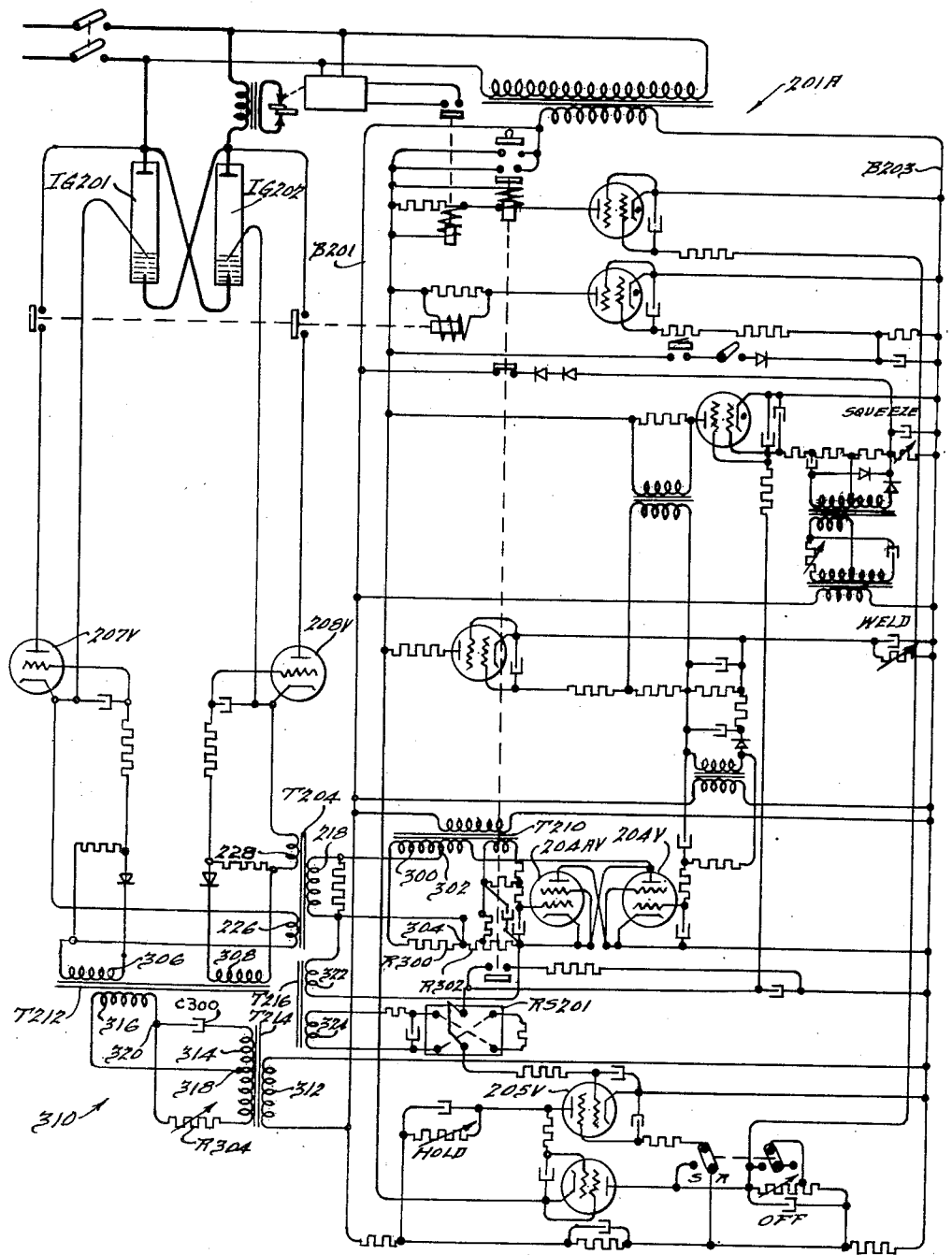

United States Patent Office 2,813,245
Patented Nov. 12, 1957

2,813,245

ELECTRICAL CONTROL APPARATUS

Roy W. Shipman, Detroit, and Keith S. McMullan, Garden City, Mich., assignors to Weltronic Company, Detroit, Mich., a corporation of Michigan Application March 26, 1954, Serial No. 419,030

16 Claims. (Cl. 323—58)

This invention relates generally to electrical control apparatus and is particularly adapted, among other uses, for controlling the sequence of operation of a welding machine.

As the use of resistance welding increases, especially in the automotive field, it has become desirable to increase the rate at which the various welds may be made. To accomplish this, much effort has been expended to increase the proportion of the time at which the welding machine is actually making welds. In the course of making a resistance weld, it becomes necessary to place the work in the throat of the machine, to move the electrodes against the work with a predetermined force, to apply welding current between the electrodes to effect the weld, to hold the electrodes against the weld for a predetermined time interval sufficient to allow the weld nugget to harden and to thereafter remove the electrodes from the work a sufficient distance to permit movement of the workpiece for the next weld spot. In industrial parlance, the above comprise the steps of squeeze, weld, hold, and off.

In most welding machines the movable head moves the movable electrode into engagement with the workpiece by fluid admitted to a piston. Due to the inertia of the relatively heavy head which carries the movable electrode and to the time period necessary to supply the fluid to the ram, there is a limit to the speed at which the head and its associated electrode may be moved into engagement with and away from the work. In an endeavor to speed up the welding operation and to increase the duty cycle of the welding machine, it has become desirable to use what is generally spoken of as "negative hold" time. This is essentially the timing out of the time period during which the electrodes are held against the work at instant prior to the instant that the welding energy ceases to flow from the source. This instant is usually chosen so that the fluid pressure in the ram commences to exhaust to initiate a reduction of pressure at which the electrode is held against the work prior to the termination of weld current flow.

This method of sequencing the welding apparatus, if properly adjusted by a skilled operator, may be set to perform satisfactory welds if the sequencing control is adjusted so that the movement of the electrodes away from the work and the reduction of the electrode pressure below a predetermined minimum amount does not actually occur until the end of the weld interval.

In the prior sequencing apparatus known to us, the initiation of off time commences at the end of hold time, and if an inexperience operator is setting the time duration of the various welding steps it is quite possible for this inexperienced operator to adjust the weld time period so that it extends beyond the instant at which the electrodes open and even the extent that such weld time is equal to or longer than the sum of hold, off, and squeeze times. When this happens, not only do the electrodes open up with welding potential applied thereto (spoken of as opening hot) and cause a defect due to arcing between the workpiece and the welding electrodes, but they will also close with potential applied thereto (spoken of as closing hot). With weld potential so appearing between the electrodes, damage to the workpiece results. In high speed operation, for which this type of system is designed, the number of welds performed per minute may be upwards of 400, and it can be seen that a considerable amount of work may be damaged, and if such work is contained within expensive jigs and dies, extensive damage thereto can occur before the operator is enabled to shut the machine down, even though an emergency stop switch is provided. Not only can such undesired operation occur if the controls are tampered with by inexperienced personnel, but through inadvertence or miscalculation, the same is likely to occur by setup men or other personnel setting up the welding apparatus for a particular operation.

It is therefore a primary object of this invention to provide a new and novel sequencing control and method which will obtain the desired high speed results but which, however, affords a certain amount of protection to avoid injury to the work, dies and jigs, which might occur as a result of errors or tampering.

Another object is to provide, in such a system, means for automatically increasing the time interval between successive welds in a sequnece of welds to prevent the start of such a subsequent weld prior to the completion of the prior weld time interval.

Another object is to provide for the automatic slowing down of the rate of making successive welds upon increase in the length of weld time interval.

Another object of this invention is to provide a sequencing system utilizing the advantages of the so-called negative hold time operation and yet providing for delaying the initiation of off timing until both hold time and weld time has timed out, as illustrated in Fig. 2.

Another object of this invention is to provide such a sequencing apparatus in which the initiation of "off time" occurs solely subsequent to the occurrence of two operating conditions which in the preferred embodiment are "weld" and "hold" times.

Another object of this invention is to provide such an apparatus which may be adjusted to operate in accordance with either of the two prior art sequencing systems commonly termed "negative hold" and "positive hold," or to operate in accordance with our improved operating sequence.

Another object of this invention is to provide a new and improved sequencing apparatus.

Another object of this invention is to provide such an apparatus in which the termination of the weld time interval is not dependent upon the conduction of an electric valve.

Another object of this invention is to provide a new and improved apparatus for timing the weld interval.

A still further object is to provide such an apparatus in which the weld interval timing network of the energy storage type is more accurately charged to provide for greater timing accuracy.

A still further object of this invention is to provide, in such a timing network, means for timing the initiation of conduction of the charge controlling thyratron so that it will charge the energy storage timing network beginning at a fixed point on the voltage wave of the alternating potential supply.

Another object of this invention is to provide a new and novel blocking system for insuring that the charge controlling thyratron will conduct solely during a single half cycle of the alternating potential supplied thereto.

Another object of this invention is to provide for providing a first predetermined time interval for moving the electrodes against the work from a wide open position and to thereafter, during a single sequence of welds, to provide a lesser time interval between successive welds and a lesser movement of the electrodes away from the workpiece.

Other objects of this invention will be apparent from the description, the appended claims, and the drawings, in which drawings:

Figure 6 is a schematic showing of a still further modified form of welding control apparatus embodying the invention; and Figure 7 is a schematic showing of a modified form of the embodiment of Fig. 6 which has been provided with heat control.

Figure 1:
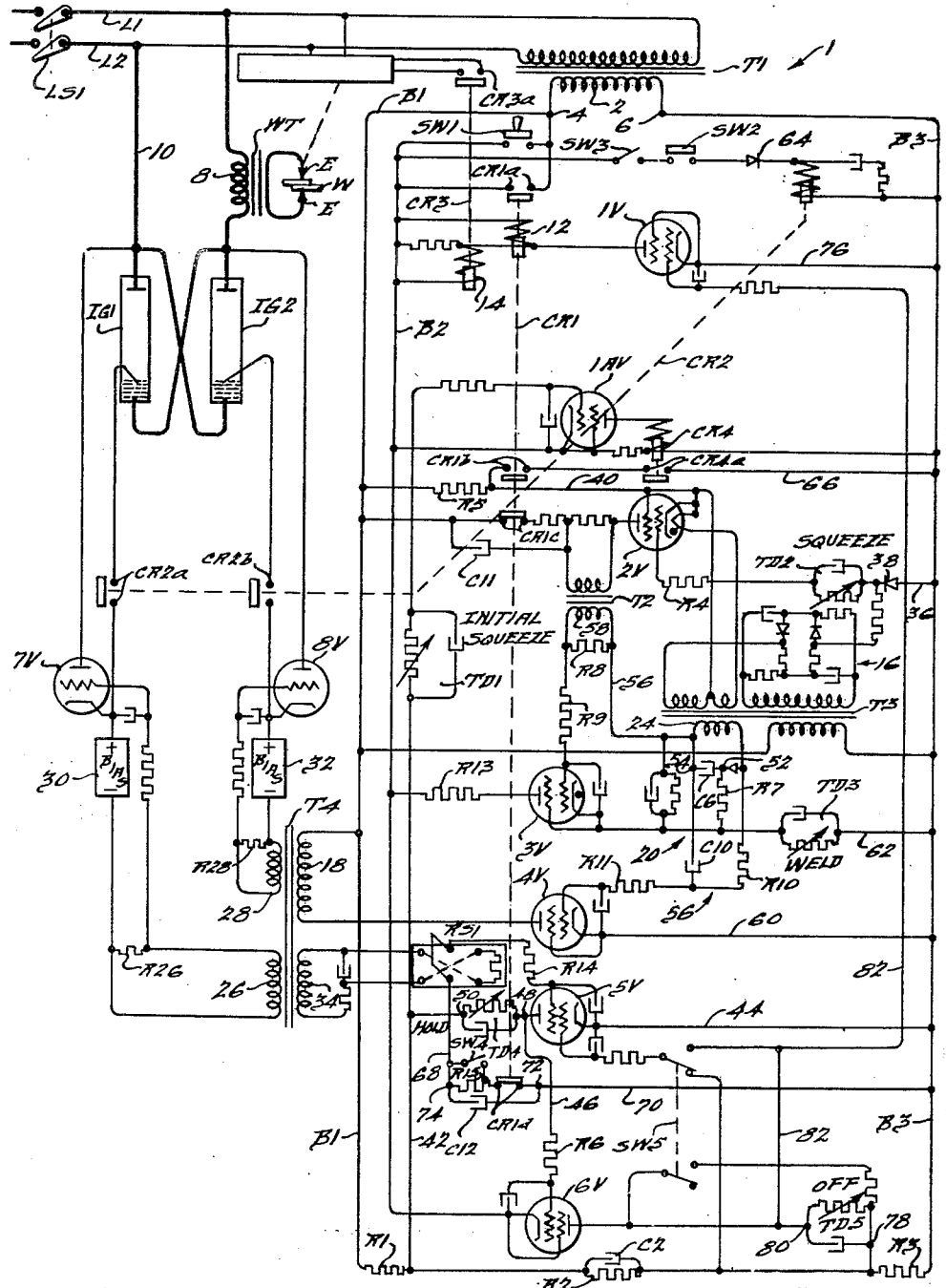
Figure 1 is a schematic showing of my invention applied to a preferred form of my invention as applied to a welding control.

Referring to drawings by characters of reference, the numeral 1 indicates generally a welding control apparatus energized from a suitable source of alternating potential supplied by the lines L1 and L2 under control of a disconnect switch LS1. The alternating potential for energizing the sequencing network is preferably through transformer T1 having its primary winding connected between the lines L1 and L2 and having a secondary winding 2. One terminal 4 of the secondary winding 2 is connected to bus B1 and through a normally open start switch SW1 and normally open contacts CR1a of relay CR1 to bus B2. The other terminal 6 of the winding 2 is continually connected with bus B3. If the voltage supplied to the lines L1 and L2 is of the proper potential, the terminals 4 and 6 may be directly connected to the lines L1 and L2 and the transformer T1 eliminated. In general practice, however, the potential appearing between the busses B1 and B3 is 115 volts while that supplied to the primary winding 8 of the welding transformer WT by the lines L1 and L2 is 220, and more usually, 440 volts. The line L1 is shown as being connected to one terminal of the primary winding 8 and the other line L2 connected through conductor 10 and a pair of reversedly connected or back-to-back ignitrons IG1 and IG2 to the other end of the winding 8.

The ignitrons IG1 and IG2 are preferably of the type which is rendered conducting by pulses of potential supplied between the igniter and cathode and such pulses in the present instant being controlled by the firing thyratrons 7V and 8V respectively. As is normal in such systems, a relay CR2 having normally open contacts CR2a and CR2b is provided for opening connection between the firing circuits of the ignitrons IG1 and IG2 and the firing thyratrons 7V and 8V to prevent any accidental firing of the ignitrons when the relay CR2 is deenergized.

Connected between the busses B2 and B3 are a plurality of electric valves 1V, 1AV, 3V, and 6V, which are preferably of the gas-filled discontinuous control type. Similar electric valves 2V, 4V, and 5V are connected between the busses B1 and B2. The sequencing of the welding machine is controlled by sequentially changing the conductivity of these valves.

Connected in series in the anode circuit of the thyratron 1V are the energizing winding 12 of the relay CR1 and the energizing winding 14 of a fluid flow controlling relay CR3 having contacts CR3a. When contacts CR3a close, the clamping circuit causes fluid to flow to the ram to move the electrodes E into engagement with the work W.

The welding head moving apparatus may be any of the usual constructions since each thereof will include a cylinder and piston combination and certain structure which carries the movable electrode and of necessity will include mass which is not instantly movable. Furthermore, even with a well-designed fluid supply and exhausting system, there is always some time delay between the time that the controlling relay CR3 is actuated and the electrodes E are positioned with the proper force against the work W. Other than that the controlling network 1 is correlated to compensate for the above time periods, the particular form which the fluid system or electrode positioning means may take, is immaterial.

A control relay CR4 is connected in the anode circuit of thyratron 1AV which conducts at the end of the initial squeeze time as determined by a bias voltage applied thereto by the initial squeeze timing network TD1. A pulse producing transformer T2 is connected in the anode circuit of the thyratron 2V which conducts at the end of normal squeeze time to initiate conduction of the thyratron 3V which then charges the weld timing network TD3 connected in its anode-cathode circuit. The firing of the thyratron 2V is controlled in part by the squeeze timing network TD2 and in part by the peaking network 16 energized by the transformer T3 so that it always initiates conduction at a fixed point in the supply voltage wave. The primary winding 18 of the weld current flow controlling transformer T4 is connected in series with the anode of the thyratron 4V whose bias circuit includes not only the weld timing network TD3 but the hold off bias producing network 20 energized from secondary winding 24 of the transformer T3. This same hold off bias network 20 also provides a hold off bias for the thyratron 3V, which hold off bias is overcome by the voltage pulse of transformer T2.

The transformer T4 has a pair of secondary windings 26 and 28 which are respectively connected through hold off or blocking bias producing devices 30 and 32 and, when energized, overcome the blocking bias potentials to cause the firing thyratrons 7V and 8V to conduct and fire the ignitrons IG1 and IG2. While a "heat control" for determining the instants in the half cycle of voltage applied to the anode-cathode circuits of the thyratrons 7V and 8V is not shown, it will be apparent that such may be provided in accordance with the teachings of Undy Patent No. Re. 23,208, dated March 14, 1950, for Timing Control System. When so applied, the windings 26 and 28, firing thyratrons 7V and 8V, and biasing resistors R26 and R28 of this application will correspond to the secondary windings of transformers T15 and T16, thyratrons V9 and V11, and resistors R9 and R11 of the Undy patent. The heat control is provided by inserting the phase shift controlled thyratrons V7 and V8 of Undy and their associated circuits without the addition of the Undy contacts R2b and indexing relay In whereby the biasing resistors R26 and R28 will unblock the Shipman et al. firing thyratrons 7V and 8V at controlled points in the voltage cycle.

The transformer T4 is also provided with a secondary winding 34 connected through a reversing switch RS1 into the shield grid circuit of the thyratron 5V and which (depending upon the position of switch RS1) will either result in the immediate blocking of the hold time network charge controlling thyratron 5V as a consequence of the energization of transformer T4 or the continued conduction thereof for the entire interval of energization of the transformer T4. When thyratron 5V conducts, it maintains the hold timing network TD4 charged and when blocked permits this network TD4 to time out to determine "hold" time. The off time timing network TD5 is connected in the anode circuit of the thyratron 6V and is charged when this thyratron 6V conducts, and when charged applies a blocking bias potential to thyratron 1V to prevent energization of relay CR3 irrespective of the condition of switch SW1.

It is believed that the further description of the network 1 may be best understood by a description of the operation thereof, which is as follows:

Upon closure of the line switch LS1, the transformer T1 is energized to supply an alternating potential between the busses B1 and B3. When energized, the busses B1 and B3 energize the transformer T3 and the bias resistors R1, R2, and R3 connected in series therebetween. A capacitor C2 is connected in shunt with the resistor R2 whereby the potential appearing across the resistors R1 and R3 will be out of phase with that appearing between the busses B1 and B3, and as to thyratrons 1V, 1AV, 5V, and 6V will provide a slightly leading conducting bias thereto to insure conduction thereof during the conductive time intervals thereof. Energization of the busses B1 and B3 also effects the charging of the squeeze timing network through a circuit which extends from the bus B3, conductor 36, rectifier 38, squeeze timing network TD2, grid resistor R4, grid to cathode of the thyratron 2V, conductor 40 and resistor R5, to the bus B1. Also, the thyratron 5V is normally conducting and charges the hold time network TD4 through a circuit which extends from the bus B1 through resistor R1, conductor 42, network TD4, thyratron 5V, and conductor 44 to the bus B3. The network TD4 maintains a blocking bias potential on the thyratron 6V; the grid of thyratron 6V being connected through grid resistor R6 and conductor 46 to the terminal 48 of the anode end of the network TD4. The other terminal 50 of the network TD4 is connected through the resistor R1, bus B1, the normally open switch SW1, and bus B2 to the cathode of the thyratron 6V so that upon closure of the switch SW1 and consequent closure of the anode-cathode circuit of the thyratron 6V, it will be held blocked.

Upon energization of the transformer T3 and consequent energization of its secondary winding 24, the capacitor C6 is energized so that its terminal 52 is positive with respect to its terminal 54. The negative terminal 52 thereof is connected through resistor R7 to the cathode of the thyratron 3V and its positive terminal 54 is connected through conductor 56, resistor R8 (connected across the primary winding 58 of the transformer T2), and grid resistor R9 to the control grid of the thyratron 3V whereby this thyratron is normally held blocked. The thyratron 4V is likewise held blocked by the biasing network 20; its cathode being connected to positive terminal 52 of capacitor C6 through conductor 60, bus B3, conductor 62, now deenergized network TD3 and resistor R7. The negative terminal 54 is connected through a clipping network 56 and grid resistor R11 to the control grid of the thyratron 4V. The clipping network comprises the winding 24, resistor R10 and capacitor C10 and provides an alternating potential which leads the potential between the busses B1 and B3 by something less than 180°, which for illustrative purposes may be 150°. The magnitude of the blocking potential is, however, greater than the alternating potential supplied by the clipping network 56 and the thyratron 4V is held blocked. Since the transformer T4 is deenergized, the bias networks 30 and 32 maintain the thyratrons 7V and 8V blocked and to insure against their premature firing, the contacts CR2a and CR2b of the relay CR2 are likewise open.

When it is desired to make a weld, the switch SW1 is momentarily closed to connect the bus B2 to the terminal 4. Since the off time network TD5 is normally deenergized as explained above, the energization of the bus B2 results in conduction of the thyratron 1V and energization of the relays CR1 and CR3. Upon closure of contacts CR3a, the clamping circuit is energized to cause fluid pressure to be supplied to the piston for moving the electrodes E against the work W. Closure of the switch SW1 also energizes the relay CR2 through the rectifier 64, if at this time the weld-no weld switches SW2 and SW3 are closed. Upon energization, the relay CR2 closes its contacts CR2a and CR2b to complete the anode-cathode circuits for the firing thyratrons 7V and 8V which is without immediate effect since these firing thyratrons are biased into nonconductivity by the networks 30 and 32.

Energization of the relay CR1 closes its contacts CR1a and CR1b and opens its contacts CR1c and CR1d. Closure of the contacts CR1a completes a holding circuit about the switch SW1 which may now be opened without interfering with the sequence now in progress. Closure of the contacts CR1b is preparatory only and without immediate effect due to the now open condition of contacts CR4a of relay CR4. Opening of the contacts CR1c and CR1d is without immediate effect and serves to open the discharge circuit for the capacitors C11 and C12.

When the bus B2 is connected to the terminal 4, the cathode of the thyratron 1AV is directly connected to the terminal 4 and the charging effect produced by the potential appearing across the resistor R1 on the initial squeeze timing delay network TD1 terminates to permit network TD1 to time out. At the end of the predetermined initial squeeze time, the network TD1 will discharge sufficiently to permit the thyratron 1AV to conduct, which thereupon closes a circuit from the bus B3 through the energizing winding of the relay CR4, thyratron 1AV to bus B2.

Upon closure of this circuit, the relay CR4 is energized and closes its contacts CR4a to complete the circuit for connecting the cathode of the thyratron 2V to the bus B3 through the previously closed contacts CR1b. Further charging of the squeeze timing network TD2 now terminates and this network now commences to time out. Subsequently a pulsing peak provided by the peaking network 16 renders the thyratron 2V conducting at a predetermined instant in a half cycle of voltage in which the bus B1 is positive with respect to the bus B3. The peaking network 16 is fully described and claimed in the copending application of Roy W. Shipman, Serial No. 396,585, filed December 7, 1953, entitled Electrical Timing Apparatus and assigned to the same assignee as this application.

The conduction of thyratron 2V causes charging current for the capacitor C11 to flow from the bus B1 through the primary winding of the transformer T2, thyratron 2V, and conductors 40 and 66 to the bus B3. This pulse of charging current flowing through the transformer T2 provides a voltage across resistor R8 in the grid-cathode circuit of the thyratron 3V which overrides the negative hold off bias voltage provided by the capacitor C6, and the thyratron 3V conducts substantially simultaneously with the conduction of thyratron 2V. When conducting, the thyratron 3V completes a circuit from the bus B2 through current limiting resistor R13, thyratron 3V, and weld timing network TD3 which charges this network in a fraction of a half cycle of the supplied potential.

The network TD3 is in the control grid circuit of the thyratron 4V and when charged provides a bias which overrides the blocking bias provided by the network 20, and renders the thyratron 4V conducting to complete a circuit from the bus B1 through the winding 18 of transformer T4, thyratron 4V, and conductor 60 to the bus B3. Thyratron 4V conducts almost simultaneously with the conduction of thyratrons 2V and 3V, since only a relatively small increment of charge in the network TD3 is sufficient to initiate conduction of the thyratron 4V. The bias voltage afforded by the clipping network 56 is relatively small and the conducting voltage provided by the network TD3 easily overrides the effect of this clipping voltage so that the instant of conduction of thyratron 4V is determined by the instant of conduction of 2V.

When energized, the transformer T4 energizes the secondary windings 26 and 28 which provide potentials which override the respective blocking bias 30 and 32, whereby the thyratrons 7V and 8V are rendered conducting for firing the ignitrons IG1 and IG2 in a manner well known in the art.

Energization of the transformer T4 also energizes the secondary winding 34 which, depending upon the position of the reversing switch RS1, will either insure conduction of the thyratron 5V for the full length of time that the transformer T4 remains energized, or will insure blocking of the thyratron 5V at the time of the energization of the transformer T4. It will be apparent that the transformer T4 is energized when the bus B1 is positive with respect to the bus B3 and the top end of the winding 18 will be positive with respect to its lower end at that instant. The winding 34 is such that the top end thereof will be positive with respect to the bottom end when the thyratron 4V conducts. With the reversing switch RS1 in its left hand position, the top end of winding 34 will be connected through the reversing switch and grid resistor R14 to the control grid of the thyratron 5V. The lower end of the winding 34 will be connected through the reversing switch, conductor 68, capacitor C12, conductor 70, bus B3, and conductor 44, to the cathode of the thyratron 5V. The grid conduction of thyratron 5V effectively charges the capacitor C12 with its right hand terminal 72 positive with respect to its left hand terminal 74. However, the charge on the capacitor C12 will be less than the potential appearing across the winding 34 and the thyratron 5V will be biased into a conducting condition each time that the transformer T4 is energized. When, however, energization of the transformer T4 ceases and no potential appears across the winding 34, the charge on the capacitor C12 will be sufficient to prevent further conduction of the thyratron 5V. Under these conditions, the hold time network TD4 will be maintained charged throughout weld time and the thyratron 6V will remain blocked.

As the weld time network TD3 discharges, the positive bias provided thereby between the grid and cathode of the thyratron 4V will gradually reduce until such time that it reaches a predetermined low value, at which time the thyratron 4V will block. Since the normal characteristic of a thyratron is such that the magnitude of its critical bias varies with the magnitude of the anode-cathode voltage placed thereacross, and it is desired to have the thyratron 4V conduct only for full half cycles, the clipping network 56 is provided to insure that if it becomes conductive at all it will commence near the beginning of the half cycle. This clipping voltage, as described above, is somewhat greater in magnitude than any difference in magnitude of the critical bias due to charge in the anode-cathode voltage placed across the thyratron during a half cycle of voltage and prevents the gradual discharge of the network TD3 from rendering the thyratron 4V conducting except at the start.

When the weld time network TD3 times out and the thyratron blocks, further energization of the transformer T4 is prevented and the bias potential appearing across the now charged capacitor C12 blocks the thyratron 5V (assuming switch RS1 in its left hand position) to initiate the timing out of the hold time network TD4. At the end of the predetermined hold time, the potential of the network TD4 becomes insufficient to block the thyratron 6V and it conducts to charge the off time network TD5 through a circuit which extends from the bus B3 through resistor R3, network TD5, thyratron 6V, to bus B2. When charged, the off time network TD5 provides a blocking bias potential between the control grid and cathode of the thyratron 1V. In this regard, it will be noted that the cathode of the thyratron 1V is connected by conductor 76 to the bus B3 and through resistor R3 to the positive terminal 78 of the network TD5 and the negative terminal 80 thereof is connected through conductor 82 to the grid of thyratron 1V.

When thyratron 1V blocks, the relays CR1 and CR3 deenergize. Deenergization of the relay CR3 opens the clamping circuit to initiate reduction in fluid pressure in the piston-cylinder assembly to initiate the opening of the electrodes E. Deenergization of relay CR1 causes its contacts CR1a and CR1b to open and its contacts CR1c and CR1d to close. Opening of the contacts CR1a is without effect if at this time, as will be assumed, the switch SW1 is still closed. Opening of the contacts CR1b disconnects the cathode of the thyratron 2V from the bus B3 to permit charging of the squeeze timing network TD2 through the grid conduction of thyratron 2V since resistor R5 now connects its cathode to bus B1. Closure of the contacts CRc discharges the capacitor C11 to ready it for a subsequent charging operation. Closure of the contacts CR1d closes a discharging circuit for the capacitor C12 to unblock the thyratron 5V which now re-conducts to re-charge the hold time network TD4. When re-charged, the hold time network TD4 blocks the thyratron 6V and initiates the discharge of the off time network TD5. At the end of a predetermined off time, the network TD5 is sufficiently discharged to remove blocking bias potential between the grid and cathode of thyratron 1V which, if the switch SW1 is still closed, reconducts to re-energize the relays CR1 and CR3 for a subsequent cycle as above described.

Referring to the operation with the reversing switch RS1 in its right hand position, the sequence will be the same up to the point that the transformer T4 is energized by conduction of thyratron 4V. In this instance, the switch RS1 will connect the lower end of the winding 34 to the grid of the thyratron 5V and the upper end to the cathode thereof. Therefore, immediately upon energization of the transformer T4, a blocking bias potential is placed between the grid and cathode of the thyratron 5V to block the same. At the termination of this half cycle, the collapsing voltage in the transformer T4 will be sufficient to charge the capacitor C12 through the grid to cathode conduction of the thyratron 4V to render the terminal 72 thereof positive with respect to the terminal 74. Under these conditions, the voltage appearing across the winding 34 is additive to that appearing across the capacitor C12 and the thyratron remains blocked throughout the energized period of the transformer T4. When the weld time is over and transformer T4 is no longer energized, the bias across the capacitor C12 itself is sufficient to maintain the thyratron 5V blocked. As described above, blocking of the thyratron 5V results in the discharging of the hold timing network TD4 which, when timed out, renders the thyratron 6V conducting to charge the off time network TD5. This results in rendering the thyratron 1V blocked, as described above, and the deenergization of relays CR1 and CR3.

It will be noted that, upon deenergization of the relay CR1 and closure of its contacts CR1d, the discharging circuit for the capacitor C12 is completed. If, as shown, the switch SW4 is open and the magnitude of the resistance of the resistor R15 is relatively high, the charge on the capacitor C12 will bleed down at a rate sufficiently low to maintain sufficient charge in the capacitor C12 to hold the thyratron 5V blocked for the next half cycle of the same polarity. Therefore, as long as the transformer T4 is energized, which is for the duration of weld time, the off time can not commence to time out until the weld time is over, even though hold time has previously timed out.

With the switch SW4 closed the capacitor C12 will discharge at a greater rate and will be sufficiently discharged before the beginning of the next half cycle of the same polarity, and if the off time network TD5 has timed out the thyratron 5V will conduct prior to the end of weld time to re-establish the blocking bias thereon and initiate the timing out of hold time. This is because the transformer T4 will not re-establish the blocking bias on thyratron 5V before it will be rendered conductive at the start of a half cycle. Since thyratron 5V is a discontinuous control type valve, it cannot be blocked by grid bias after it once commences to conduct. Therefore a high rate of discharge of capacitor C12 enables thyratron 5V to conduct to initiate off time as a consequence of the timing out of hold time.

Figure 4:
Figure 4 is a view similar to Figs. 2 and 3 but showing a still different form of sequence of operation.
Figure 4:
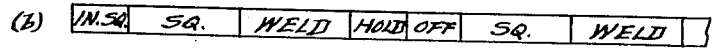
Figure 4:
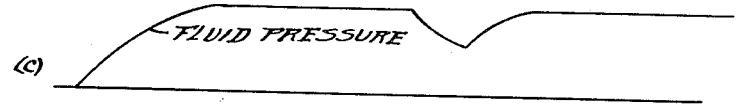
Figure 4:
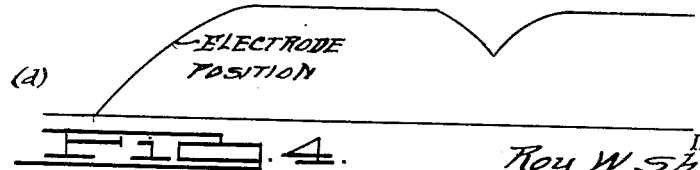

Fig. 4 (b) shows the sequence relationship which is established when the switch RS1 is in its left hand position.

Figure 2:
Figure 2 is a diagrammatical representation of one sequence of operation of the apparatus of Fig. 1 and its relationship to the characteristics of a type of welding machine with which it is associated.
Figure 2:
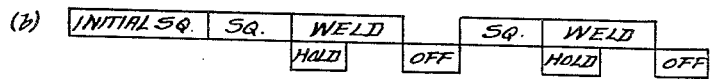
Figure 2:
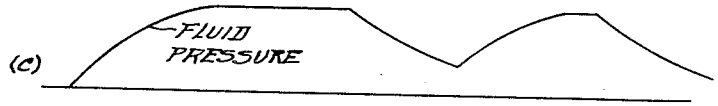
Figure 2:
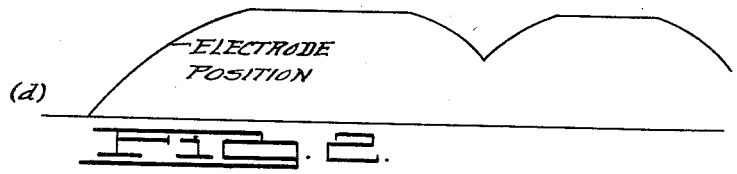
Figure 3:
Figure 3 is a view similar to Fig. 2 but showing a different sequence of operation.
Figure 3:
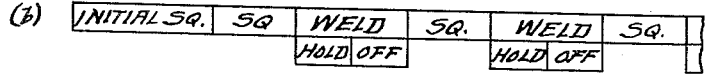
Figure 3:
Figure 3:
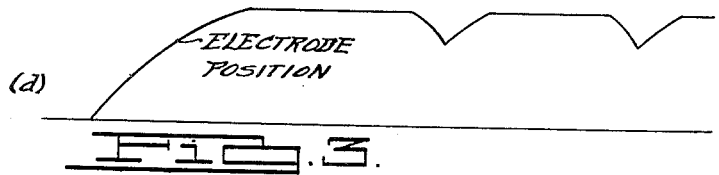

Fig. 2 (b) shows the sequence relationship when the switch RS1 is in its right hand position and the switch SW4 is open; and the Fig. 3 (b) shows the sequence when the switch RS1 is in its right hand position and the switch SW4 is closed.

Figs. 2, 3, and 4 (a) show the periods in which the transformer T4, and consequently the welding transformer WT, are energized; Figs. 2, 3, and 4 (c) show a typical pressure curve of the fluid pressure applied to the ram as controlled by the relay CR3; and Figs. 2, 3, and 4 (d) show the movement of the electrodes against the work W under the various forms of sequencing.

It will be noted that the pressure changes lead the changes in position of the electrode and that initially the electrodes must move further in order to close against the work W than between subsequent operations. This initial further open position permits the work to be inserted between the electrodes with greater ease and in many instances, unless this greater opening were provided, the work could not be inserted. In general, this further opening position of the electrodes is not necessary when moving the work from one weld position to the next of a series of welds and the time necessary to move the electrodes the greater distance can be eliminated. In order to provide for this initial greater movement, an initial squeeze time as determined by the network TD1, is provided.

Since the greater movement occurs only at the start of a series of welds, the initial squeeze timing is not used after the first weld and the normal squeeze or network TD2 is depended upon for providing for the electrode moving time. This relationship with respect to timer operation is believed to be clearly shown in Figs. 2, 3, and 4 in which the horizontal distance represents time.

The network 1 may be set to make only a single weld irrespective of the length of time that the switch SW1 is closed by moving the single-repeat switch SW5 from its shown lower position to its upper position, in which event the potential appearing across the off time network TD5 is applied between the control grid and cathode of the thyratron 5V to render this thyratron blocked in response to conduction of the thyratron 6V. The thyratron 5V will continue to be blocked as long as the thyratron 6V continues to conduct and will not under these conditions re-conduct as a consequence of the blocking of thyratron 1V and consequent deenergization of relay CR1. This interlocking arrangement continues until the start switch SW1 is opened to interrupt the anode-cathode circuit for thyratron 6V to permit network TD5 to time out. Therefore, with switch SW5 in its upper position, only a single weld will be made irrespective of the time switch SW1 is held closed. In order to speed the timing out of the network TD5 in single cycle operation, the switch SW5 also provides a shunt circuit for a rapid discharge of the capacitor in the off time network so that the network 1 will reset to its standby condition rapidly.

Figure 5:
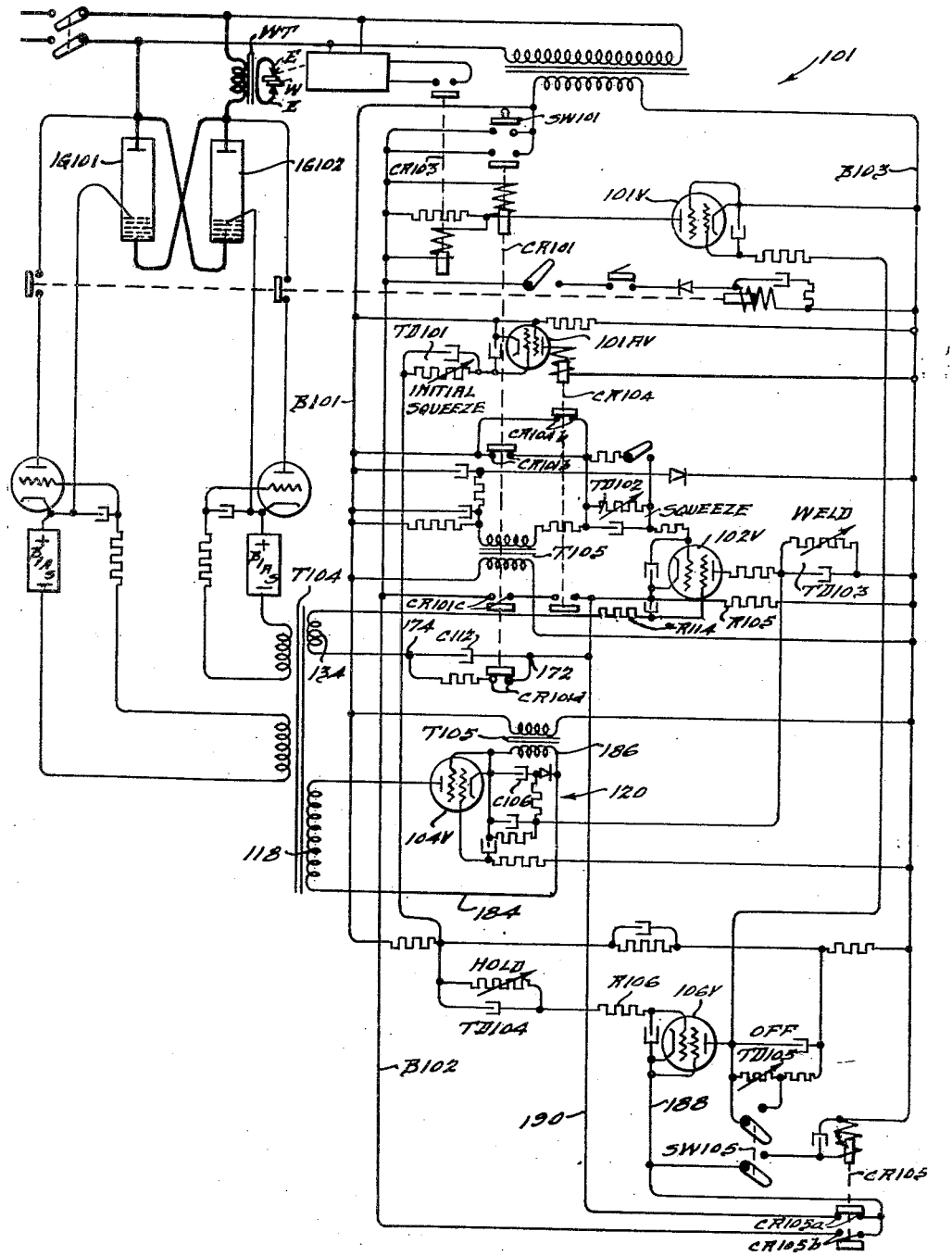
Figure 5 is a schematic showing of a modified form of sequencing apparatus for a welding system embodying our invention.

In Fig. 5 there is shown a modified form of sequencing network 101 in which, as far as practicable, corresponding elements are designated by a numeral 100 digits higher than those designating corresponding parts in the network 1.

It is believed that the description of the network 101 may best be understood by a description of operation thereof. Closure of the switch SW101 energizes the bus B102 to complete the anode-cathode circuit for the thyratron 101V, which conducts to energize the relays CR101 and CR103. Closure of the relay CR103 results in movement of the electrodes E against the work W as above described. Upon energization of the bus B102, the initial squeeze timing network TD101 times out, at the end of which time the thyratron 101AV conducts to energize the relay CR104, which results in the timing out of the squeeze timing network TD102. This network TD102 was previously charged through a circuit which extended from the bus B101 through contacts CR101b in shunt with contacts CR104b, network TD102, grid to cathode of thyratron 102V, and resistor R105 to bus B103. As the network TD102 times out, a voltage peak from the peaking transformer T105 renders the thyratron 102V conducting to energize the weld timing network TD103. The weld timing network TD103 is in the grid circuit of the thyratron 104V which will be rendered conducting substantially simultaneously with the rendering of thyratron 102V conducting, to energize the transformer T104.

This circuit extends from the anode of thyratron 104V, to the upper terminal of winding 118, of transformer T104, from the lower terminal of this winding 118 through conductor 184 and secondary winding 186 of transformer T105 to the cathode of thyratron 104V. The winding 186 also energizes the capacitor C106 of the network 129 to provide a blocking bias potential which is overridden by the potential of the weld time network TD103. Energization of the transformer T104 results in firing of the ignitrons IG101 and IG102 and energization of the weld transformer WT, as described above in connection with Fig. 1. If a heat control is desired, it may be applied as described in connection with Fig. 1.

When transformer T104 is energized, winding 134 is energized and is phased such that the collapse of flux in the transformer T104 makes the top end thereof positive with respect to the bottom end and this occurs during the half cycle in which the anode of the thyratron 102V is negative with respect to its cathode. This potential pulse is used to charge the capacitor C112 with its terminal 172 positive with respect to its terminal 174, and is applied through a circuit which extends from the top end of winding 134 through the grid resistor R114, shield grid to cathode of the thyratron 102V, terminal 172, capacitor C112, and terminal 174 back to the lower end of the winding 134. Since the charging of capacitor C112 occurs during the half cycle in which the thyratron 102V can not conduct because of the relative polarity of its anode and cathode, the capacitor C112 limits the period of conduction of thyratron 102V to the single half cycle in which it was initially rendered conducting by the peaking transformer T105, and the weld time network TD103 times out measuring weld time.

The electrode closed or hold timing network TD104 is energized during standby condition of the network 101 through a circuit which extends from bus B101 through resistor R116, network TD104, grid resistor R106, grid to cathode of thyratron 106V, conductor 188, normally closed contacts CR105a, conductor 190, and resistor R105, to bus B103. When the contacts CR101c are closed at the start of squeeze time, further charging of the network TD104 is terminated and this network commences to time out. The time constant of this network is sufficient so that it will time out at the desired instant with respect to the timing out of the weld time network TD103. Timing out of network TD104 permits the thyratron 106V to conduct to charge the off time timing network TD105, whereby the potential appearing thereacross blocks the thyratron 101V to cause deenergization of the relays CR101 and CR103. Deenergization of the relay CR103 results in opening of the electrodes E, as above described, while deenergization of the relay CR101 results in re-charging of the squeeze timing network and discharging of the blocking capacitor C112. Opening of the contacts CR101c not only interrupts the connection of the cathode of the thyratron 102V to the bus B102 for permitting charging of the squeeze time network TD102, but also interrupts the anode-cathode circuit of the thyratron 106V whereby the network TD105 is permitted to time out to remove the blocking bias on the thyratron 101V at the end of off time. If at this time the switch SW101 is still closed, a subsequent cycle will result, as just described.

If only a single operation of the network 101 is desired irrespective of the length of time that the switch SW101 is maintained closed, the single-repeat switch SW105 is moved from its shown lower position to its upper position whereby the circuit through the relay CR105 is completed upon closure of the contacts CR101c and the lower contacts of relay CR104. When energized, relay CR105 opens its contacts CR105a and closes its contacts CR105b. This shifting of the connection by relay CR105 connects the cathode of the thyratron 106V directly to the bus B102, which connection is not interrupted at the end of hold time due to deenergization of relay CR101 and subsequent opening of the contacts CR101c. Therefore, the thyratron 106V, once having been rendered conducting, will continue to conduct and maintain the off time network TD105 charged as long as the switch SW101 remains closed. Opening of the switch SW101 deenergizes the anode-cathode circuit of the thyratron 106V permitting the network TD105 to time out rapidly through the now shunted variable off time resistor and opens the circuit of the relay CR105 permitting its contacts CR105b to open and its contacts CR105a to close.

Network 201 of Fig. 6 is in many respects similar to the network 1 of Fig. 1 and similar parts are designated by numerals 200 digits higher than the numeral designating corresponding parts of Fig. 1. In view of the detailed description given above, it is believed that the description of Fig. 6 may best be understood by a description of the operation thereof, which is as follows:

When it is desired to initiate a weld, the start switch SW201 is closed to complete the anode-cathode circuit for the thyratron 201V, which immediately begins to conduct, energizing the relays CR201 and CR203. As described above, relay CR203 upon energization, causes the electrodes E to be moved against the work W. Energization of the relay CR201 opens the discharge circuit of the blocking capacitor C212 and closes the shunt circuit around the initiating switch SW201, which may now be opened without interrupting the cycle now in process. Connection of the bus B202 to the terminal 204 also initiates the timing out of the initial squeeze time delay network TD201 which, at the end of the initial squeeze period, renders the thyratron 201AV conducting to energize the relay CR204. Upon concurrent energization of the relays CR201 and CR204, the charging circuit for the squeeze time network TD202 is interrupted and this network begins to time out to measure squeeze time. Eventually the potential across the network TD202 will be reduced sufficiently so that a voltage peak supplied from the peaking network 216 will fire the thyratron 202V at a particular point on the half cycle of voltage in which bus B202 is positive with respect to bus B203. When thyratron 202V conducts it energizes the transformer T202 so that its output winding 258 supplies a positive triggering pulse to the thyratron 203V which overcomes the blocking bias supplied thereto from the capacitor C206 and thyratron 203V will conduct.

Conduction of the thyratron 203V charges the weld time delay network TD203. Upon the network TD203 receiving a sufficient increment of charge, the thyratron 204V will be rendered conducting to energize the winding 218 of the transformer T204. The thyratron 204AV is connected in trailing relationship in the usual manner with thyratron 204V so that the thyratron 204AV will conduct each half cycle following the half cycle in which thyratron 204V conducts, but will not conduct in any half cycle following the half cycle in which the thyratron 204V does not conduct.

Upon energization of the transformer T204, the windings 226 and 228 thereof unblock the firing thyratrons 207V and 208V to fire the ignitrons IG201 and IG202 for supplying a potential to the welding transformer WT. As explained in connection with Fig. 1, the firing of the thyratrons 202V, 203V, and 204V are substantially simultaneous, and the charging of the capacitor C212 occurs prior to the next positive half cycle to the positive half cycle in which the thyratron 202V conducted so that the thyratron conducts for no more than a single half cycle. Since thyratron 202V conducts for only a single half cycle and the thyratron 203V can not conduct unless the thyratron 202V conducts, only a single charging pulse will be supplied to charge the weld time network TD203. Therefore, the weld time network immediately begins to time out and at the end of its timing out period, the blocking bias afforded by the capacitor C206 will again be applied to block the thyratron 204V and the thyratron 204AV will cease conducting following the half cycle after which the thyratron 204V last conducted. This terminates further energization of the transformer T204 and further firing of the ignitrons IG201 and IG202.

The operation of the hold time and off time networks is the same as that described in connection with Fig. 1 and, depending upon the position of the switch RS201 and of the switch SW204, the network will operate to provide hold and off times as described above and as shown in Figs. 2, 3, and 4.

In Fig. 1, the weld-no weld control relay CR2 was actuated directly by the switches SW2 and SW3. In Fig. 6, the energization of the relay CR202 is also under control of the switches SW202 and SW203. However, instead of these switches directly controlling the relay, they control a bias network 292 which overcomes the normal blocking bias applied by the network 294 between the control grid and cathode of thyratron 209V. Therefore, upon closure of both of the switches SW202 and SW203, the network 292 will be charged to render the thyratron 209V conducting whereby the current flow through the thyratron 209V will energize the relay CR202 to complete the anode-cathode circuit of the firing thyratrons 207V and 208V.

In Fig. 7 there is shown a network 201A which is very similar to network 201 of Fig. 6 but differs therefrom in that heat control is provided to control the instants in the voltage wave at which the ignitrons IG201 and IG202 are rendered conducting. Elements which correspond to those of Fig. 6 are designated by the same reference numerals. The thyratrons 204V and 204 AV are rendered conducting exactly as in Fig. 6 but instead of being connected between the busses B201 and B203 they are connected in a bridge circuit having as one of its legs the center tapped winding 300 of transformer T210 and as the other leg the series connected resistors R300 and R302. The primary winding 218 of the transformer T204 is connected between the center terminal 302 of the winding 300 and the common terminal 304 of the series connected resistors R300 and R302. Such a general arrangement is shown and described in the copending application of Roy W. Shipman and Harry E. Colestock, Serial No. 368,479, filed July 16, 1953, for Power Regulating Apparatus.

With this arrangement, the transformer T204 is normally maintained energized by the potential normally existing between terminals 302 and 304. The secondary windings 226 and 228 of transformer T204 are respectively connected in series with the windings 306 and 308 of the firing bias producing transformer T212. The magnitude and phase of the potential supplied by the windings 226 and 228 is such that when energized these windings maintain a blocking bias potential between the grids and cathodes of the thyratrons 207V and 208V whenever a positive to negative potential appears between their anodes and cathodes irrespective of the potential supplied by transformer T212.

When the thyratrons 204V and 204AV conduct, a balanced potential condition exists between the terminals 302 and 304 and the windings 226 and 228 are deenergized. When this occurs, the potential supplied by the windings 306 and 308 of transformer T212 is no longer biased out and the firing thyratrons 207V and 208V become conductive to fire the ignitrons IG201 and IG202 at a predetermined point on the voltage wave as determined by the setting of the resistor R304 of the phase shifting network 310.

The phase shifting network 310 is of conventional character and includes a transformer T214 having its primary winding 312 connected between the busses B201 and B203 and a center tapped secondary winding 314. The outer end terminals of the secondary winding are connected to each other through series connected capacitor C300 and resistor R304. The primary winding 316 of the firing bias producing transformer T212 is connected between the center tap 318 of the winding 314 and the common terminal 320 of the capacitor C300 and resistor R304.

In network 201, the transformer T204 was energized during weld time and the biasing circuit for the thyratron 205V was energized from the secondary winding 234. In network 201A, the transformer T204 is deenergized during weld time and the biasing circuit for the thyratron 205V is energized from a transformer T216 having its primary winding 322 connected in shunt with the resistor R302 which is energized only during the weld interval. In view of the similarity of network 201A to the network 201, it is believed that further comment is unnecessary.

While we have shown, in accordance with the patent statutes, four preferred forms of the invention, it is to be distinctly understood that these are illustrative and that the scope of protection is to be determined by the scope of the hereinafter appended claims.

What is claimed and is desired to be secured by United States Letters Patent is as follows:

1. In a repeating sequencing control, a plurality of timing apparatus each having a ready condition and a timing out condition, first initiating means for initiating the timing out of said first timing apparatus, second initiating means responsive to the timing out of said first timing apparatus for initiating the timing out of said second timing apparatus and including a circuit energized as a consequence of the timing out of said first timing apparatus, third initiating means responsive to the timing out of said second timing apparatus for placing a third of said timing apparatus in its ready condition, fourth initiating means responsive to the placing of said third apparatus in its ready condition for placing said second timing apparatus in its ready condition, and means responsive to the energized condition of said circuit for rendering said second timing apparatus ineffective to attain its ready condition as a consequence of the actuation of said fourth initiating means.

2. In a sequencing control, a plurality of timing apparatus, a first initiating device for initiating the timing out of one of said timing apparatus, means for initiating the timing out of a second of said timing apparatus as a consequence of the timing out of said one timing apparatus, selectively operable means having two operating conditions, said selective means when in a first of its two conditions being effective to initiate the timing out of a third of said timing apparatus as a consequence of the timing out of said first timing apparatus, said selective means when in a second of its two conditions being effective to initiate the timing out of said third timing apparatus as a consequence of the timing out of said second timing apparatus, means responsive to the timing out of said third timing apparatus for initiating the timing out of a fourth of said timing apparatus, and means actuated when said selective means is in its said first position and during the timing out of said second timing apparatus for preventing the initiation of the timing out of said fourth timing apparatus irrespective of the timing out of said third timing apparatus whereby timing out of said fourth timing apparatus must always occur subsequent to the timing out of said second timing apparatus.

3. In a timing apparatus, a plurality of electric valves each having an anode and a cathode and a control electrode, a pair of terminals adapted to be energized from an alternating current source, a relay having an energizing winding and a circuit controller, a first circuit means connecting said winding in series circuit with said anode and said cathode of a first of said valves between said terminals, a plurality of timing networks each comprising an energy storage component and a discharge component, a first transformer having a primary winding and a secondary winding, an impedance element connected in shunt with said primary winding, a chargeable component, circuit means connecting said chargeable component and said primary winding and said anode and said cathode of a second of said valves in series circuit between said terminals, circuit means connecting a first of said timing networks between said control electrode and said cathode of said second valve, means normally maintaining said storage component of said first network charged, means including said circuit controller for initiating a timing out of said first timing network whereby said second valve is rendered conductive at the expiration of a predetermined time interval, circuit means connecting a second of said timing networks in series with said anode and said cathode of a third of said valves, a bias producing apparatus, circuit means connecting said bias apparatus and said secondary winding between said control electrode and said cathode of said third valve, a work circuit, circuit means connecting said work circuit between said anode and said cathode of a fourth of said valves, circuit means connecting said bias apparatus and said second timing network between said control electrode and said cathode of said fourth valve, an energy storage device, a source of alternating potential, means rendering said just mentioned source energized and deenergized as a consequence of the energization and deenergization of said work circuit, circuit means connecting said last-named storage device and said just-mentioned source of alternating potential between said cathode and said control electrodes of a fifth of said valves, circuit means connecting a third of said timing networks between said control electrode and said cathode of a sixth of said valves, circuit means connecting said third timing network in series with said anode and said cathode of said fifth valve, circuit means connecting a fourth of said timing networks in series with said anode and said cathode of said sixth valve, and circuit means including said fourth network connected between said cathode and said control electrode of said first valve for controlling the conductivity of said first valve and consequently the energization of said relay.

4. In a sequencing control, a plurality of timing networks, each said network comprising an energy storage component and a discharge component for discharging its respective said storage component at a predetermined rate, a plurality of electric valves each having a pair of main electrodes and control means for controlling current flow therethrough, a device for providing peaked voltage impulses, circuit means connecting said voltage impulsing device and one of said timing networks between one of said main electrodes and said control means of a first of said valves, a work circuit including a second of said valves, means connecting a second of said timing networks between one of said main electrodes and said control means of said second valve, and means responsive to the conduction of said first valve for supplying, as a maximum, a single half cycle pulse of energy to said second timing network whereby its said storage component is first charged and thereafter discharges through its respective said discharge component to measure out a predetermined time interval during which said second valve is rendered conductive.

5. In a sequencing control, a plurality of timing networks, each said network comprising an energy storage component and a discharge component for discharging its respective said storage component at a predetermined rate, a plurality of electric valves each having a pair of main electrodes and control means for controlling current flow therethrough, a device for providing peaked voltage impulses, circuit means connecting said voltage impulsing device and one of said timing networks between one of said main electrodes and said control means of a first of said valves, a work circuit including a second of said valves, means connecting a second of said timing networks between one of said main electrodes and said control means of said second valve, means responsive to the conduction of said first valve for supplying, as a maximum, a single half cycle pulse of energy to said second timing network whereby its said storage component is first charged and thereafter discharges through its respective said discharge component to measure out a predetermined time interval during which said second valve is rendered conductive, means connecting a third of said timing networks between one of said main electrodes and said control means of a third of said valves, means for initiating the discharge of said storage component of said third timing network, and means responsive to the conduction of said third valve for recharging said storage component of said first timing network.

6. In a sequencing network, a plurality of electric valves each having a pair of main electrodes and a control means for controlling conduction between said electrodes, a plurality of timing networks each including a chargeable component and a discharging component, a voltage peaking means, a circuit connecting said peaking means and one of said timing networks between one of said main electrodes and said control means of a first of said valves, an energy storage device, a translating device, circuit means connecting said storage device and said translating device in circuit with said main electrodes of said first valve, circuit means including a source of bias potential connecting said translating device between one of said main electrodes and said control means of a second of said valves, circuit means connecting a second of said timing networks in circuit with said main electrodes of said second valve, circuit means including said source of bias potential connecting said second timing network between one of said main electrodes and said control means of a third of said valves, and a work circuit connected in circuit with said main electrodes of said third valve.

7. In a timing device, an electric valve having a pair of main electrodes and a control means controlling conduction between said main electrodes, a normally deenergized timing network connected in circuit with said main electrodes and including a chargeable component and a discharging component, a control network connected between one of said main electrodes and said control means and including a first and a second bias establishing device, said first device being of such polarity and magnitude that when acting alone it will hold said valve non-conductive, said second device being effective to overcome said first device and render said valve conducting, an energy storage device and means responsive to a charged condition of said storage device to render said second bias device ineffective whereby to cause said first bias device to establish a blocking bias between said one electrode and said control means.

8. In a timing device, a work circuit, a first electric valve having a pair of main electrodes connected to control the energization of said work circuit, said work circuit having a pair of output terminals which are pulsatingly energized during energization of said work circuit, said valve having a control electrode, a timing network connected between said control electrode and one of said main electrodes, a second electric valve having a pair of electrodes, an energy storage component, and circuit means connecting said storage component in series with said output terminals and said electrodes.

9. A network comprising a pair of terminals adapted to be energized with an alternating potential, an electric valve having a pair of main electrodes and a control electrode, a source of bias potential, apparatus energized from said terminals for producing a voltage pulse in timed relation to the alternating potential supplied to said terminals, a timing network including an energy storage component and a discharge component connected in circuit with said main electrodes, circuit means connecting said source of bias potential and said pulse producing apparatus between said control electrode and one of said main electrodes in such relation that said bias source maintains said valve nonconducting except when a pulse is produced by said pulse producing apparatus, and means including an energy storage device for actuating said pulse producing apparatus, said last named means being connected between said pair of terminals and chargeable as a consequence of current flow between said terminals during a single half cycle of the potential supplied to said terminals whereby said valve will be rendered conducting solely during a single half cycle.

10. In a timing apparatus, a work circuit, switching means controlling the energization of said circuit, said work circuit having a pair of output terminals supplied with an alternating potential when said work circuit is energized, an electric valve having a pair of main electrodes and a control electrode, a control network connected in circuit with said main electrodes and a source of alternating potential, an energy storage device, circuit means connected to be energized from said output terminals and connected to apply a potential between said control electrode and one of said main electrodes, said circuit means including said storage device in series between two of said terminals, and a reversing switch for interchanging the phasing of the potential at said output terminals with respect to that at said source of alternating potential.

11. In a sequencing control, a plurality of timing devices, an electrical work circuit, means initiating the concurrent timing out of a first and a second of said devices and the energization of said electrical work circuit, said first timing network acting to deenergize said work circuit as a consequence of the timing out of said first timing device, means responsive to the timing out of said second network to actuate a third of said networks to time out, and means energized consonantly with said work circuit for preventing the timing out of said third network until said first network has timed out.

12. In a repeating sequencing control, a plurality of timing devices, means interconnecting a first and a second and a third of said devices to time out in endless sequence, an electrical work circuit energized as a consequence of the timing out of said first device, means actuated as a consequence of the timing out of a fourth of said timing devices for terminating the energization of said work circuit, and means energized consonantly with said work circuit for preventing the timing out of said third network until said fourth network has timed out.

13. In a timing apparatus, a transformer having a primary and a secondary winding, a first valve controlling flow of current through said primary winding and having a pair of controlling electrodes, a biasing network connected across said electrodes and including a resistor capacitor timing circuit and a source of blocking bias potential, said network being arranged to permit conduction of said valve solely when the potential of said timing circuit is above a predetermined minimum value, a second electric valve having an anode circuit and a pair of controlling electrodes, a second bias network connected across said electrodes of said second valve and including said secondary winding and an energy storage device, a timing device connected in said anode circuit of said second valve and arranged to time out as a consequence of termination of conduction of said anode circuit and to reset to its initial condition as a consequence of conduction of said anode circuit, a second resistor capacitor timing circuit, a source of charging potential, switch means controlled by said timing device and operable to connect said second timing circuit to said charging potential solely subsequent to the timing out of said timing device, a discharge circuit for said energy storage device and effective to discharge said storage device at a predetermined rate, and circuit elements actuated as a consequence of the charging of said second timing circuit for actuating said discharge circuit.

14. In a sequencing control, a first electric valve having principal electrodes, a capacitor, a first transformer having a primary winding and a secondary winding, means connecting said capacitor and said primary winding and said electrodes in series circuit, a second electric valve having principal electrodes and a control electrode, a bias network, circuit means connecting said bias network and said secondary winding between said control electrode and one of said principal electrodes of said second valve, a timing network including an energy storage device and a discharging device, means connecting said timing network in series circuit with said principal electrodes of said second valve, a third electric valve having a pair of principal electrodes and a control electrode, a second transformer having a primary winding and a secondary winding, means connecting said primary winding of said second transformer to said principal electrodes of said third valve, means connecting said timing network between said control electrode and one of said principal electrodes of said third valve, a fourth electric valve having a pair of principal electrodes and a control electrode, an energy storage apparatus, means connecting said storage apparatus and said secondary winding of said second transformer between said control electrode and one of said principal electrodes of said fourth valve, a second timing network including an energy storage device and a discharging device, means connecting said second timing network to said principal electrodes of said fourth valve, a fifth electric valve having a pair of principal electrodes and a control electrode, means connecting said second timing network between said control electrode and one of said principal electrodes of said fifth valve, a third timing network including an energy storage device and a discharging device, means connecting said third timing network to said principal electrodes of said fifth valve, a discharging apparatus for said energy storage apparatus and including means to time the rate of discharge of said energy storage apparatus, means connected across said third timing network and effective when the charge on said energy storage device of said third timing network is above a predetermined magnitude to render said discharging apparatus effective, said discharging apparatus being so arranged relative to said energy storage apparatus that the charge on said energy storage apparatus will remain above a predetermined magnitude for at least a time interval of one complete cycle of the potential applied to said pair of terminals.

15. In a sequencing control, a first electric valve having principal electrodes, a capacitor, a first transformer having a primary winding and a secondary winding, means connecting said capacitor and said primary winding and said electrodes in series circuit, a second electric valve having principal electrodes and a control electrode, a bias network, circuit means connecting said bias network and said secondary winding between said control electrode and one of said principal electrodes of said second valve, a timing network including an energy storage device and a discharging device, means connecting said timing network in series circuit with said principal electrodes of said second valve, a third electric valve having a pair of principal electrodes and a control electrode, a second transformer having a primary winding and a secondary winding, a pair of terminals adapted to be energized from a source of alternating potential, means connecting said primary winding of said second transformer and said principal electrodes of said third valve across said terminals, means providing a source of alternating potential which is phase shifted ahead of the potential between said pair of terminals, means connecting the output of said just-mentioned means and said timing network between said control electrode and one of said principal electrodes of said third valve, a fourth electric valve having a pair of principal electrodes and a control electrode, an energy storage apparatus, means connecting said storage apparatus and said secondary winding of said second transformer between said control electrode and one of said principal electrodes of said fourth valve, a second timing network including an energy storage device and a discharging device, means connecting said second timing network to said principal electrodes of said fourth valve, a fifth electric valve having a pair of principal electrodes and a control electrode, means connecting said second timing network between said control electrode and one of said principal electrodes of said fifth valve, a third timing network including an energy storage device and a discharging device, means connecting said third timing network to said principal electrodes of said fifth valve, a discharging apparatus for said energy storage apparatus and including means to time the rate of discharge of said energy storage apparatus, means connected across said third timing network and effective when the charge on said energy storage device of said third timing network is above a predetermined magnitude to render said discharging apparatus effective, said discharging apparatus being so arranged relative to said energy storage apparatus that the charge on said energy storage apparatus will remain above a predetermined magnitude for at least a time interval of one complete cycle of the potential applied to said pair of terminals.

16. The combination of claim 15 in which a polarity reversing switch is connected in the means which is connected across said control electrode and said one principal electrode of said fourth valve.

References Cited in the file of this patent

UNITED STATES PATENTS

| | | |
|---|---|---|
| 2,295,601 | Overbeck | Sept. 15, 1942 |
| 2,371,981 | Few | Mar. 20, 1945 |
| 2,422,020 | Kingsmill | June 10, 1947 |
| 2,573,360 | Rockafellow | Oct. 30, 1951 |
| 2,600,337 | Stadum | June 10, 1952 |
| 2,612,579 | Bivens | Sept. 30, 1952 |
| 2,619,591 | Parsons | Nov. 25, 1952 |
| 2,623,146 | Anger | Dec. 23, 1952 |
| 2,639,361 | Hartwig | May 19, 1953 |
| 2,650,333 | Taylor | Aug. 25, 1953 |
| 2,653,209 | Hartwig | Sept. 22, 1953 |
| 2,725,472 | Hartwig | Nov. 29, 1955 |

OTHER REFERENCES

Electronics, July 1950, pp. 70–73.